United States Patent

[11] 3,581,641

[72] Inventor Hubert Nerwin
Rochester, N.Y.
[21] Appl. No. 700,056
[22] Filed Jan. 24, 1968
[45] Patented June 1, 1971
[73] Assignee Eastman Kodak Company
Rochester, N.Y.

[54] FILM CARTRIDGE AND CAMERA
12 Claims, 4 Drawing Figs.
[52] U.S. Cl. .................................................. 95/31
[51] Int. Cl. ........................................... G03b 19/04
[50] Field of Search ................................ 95/31, 31
ACFS, 31 FSI; 352/72, 78

[56] References Cited
UNITED STATES PATENTS
2,381,033  8/1945  Bolsey ....................... 95/31
2,420,628  5/1947  Stoiber ....................... 95/31
2,906,184  9/1959  Hennig et al ................. 95/31
3,347,142  10/1967 Steisslinger ................... 95/31
3,402,650  9/1968  Hoadley ..................... 95/31(X)

FOREIGN PATENTS
1,236,928  3/1967  Germany

Primary Examiner—John M. Horan
Attorneys—Robert W. Hampton and Ronald S. Kareken ABSTRACT: A camera-cartridge apparatus for locating an exposure frame of the film accurately in the focal plane of the camera lens system. By having the focal plane determining means of the camera directly contact the emulsion surface of the film rather than a body part of the cartridge, the fabrication tolerances of the cartridge are rendered less critical.

Patented June 1, 1971
3,581,641
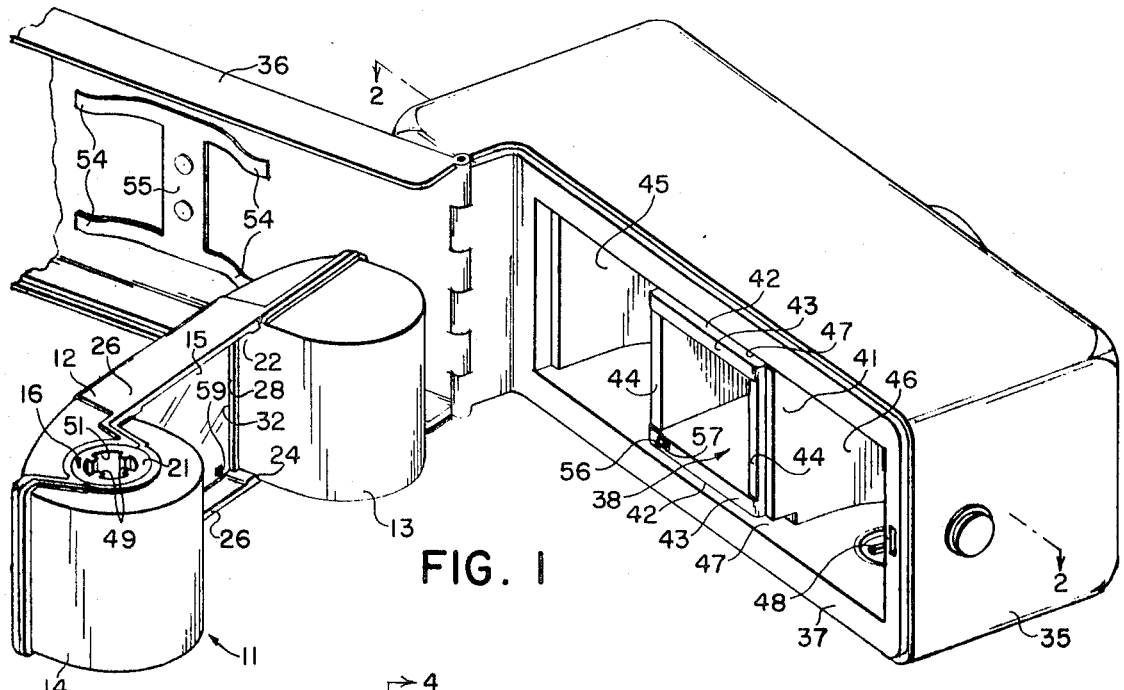
FIG. 1
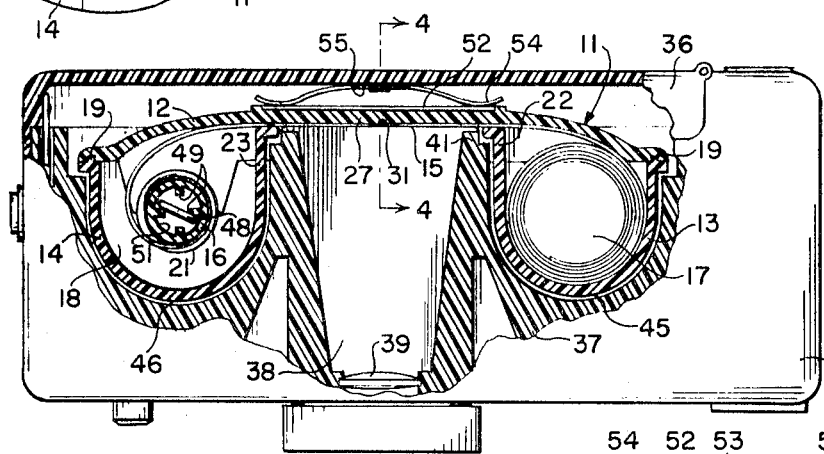
FIG. 2
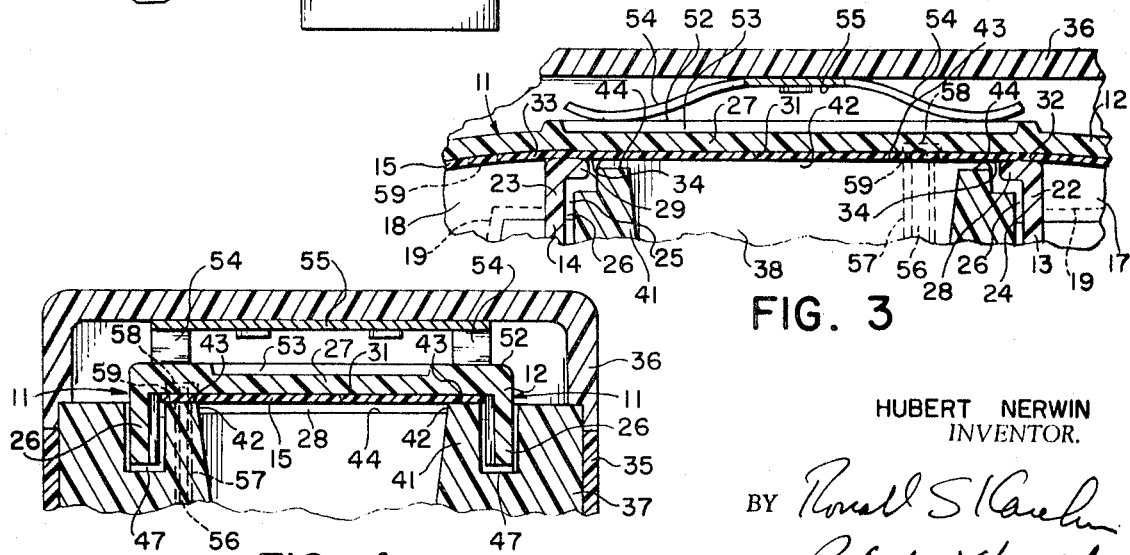
FIG. 3
FIG. 4
HUBERT NERWIN
INVENTOR.
BY Ronald S. Kandler
Robert W. Hampton
ATTORNEYS

FILM CARTRIDGE AND CAMERA

BACKGROUND OF THE INVENTION

1. Field of the Invention

The present invention relates to film cartridges and cameras for use with such cartridges. More particularly, this invention relates to improved means for accurately supporting an exposure frame of a strip of film in a double compartment film cartridge at a flat focal plane of the lens system of a camera adapted to receive such a cartridge.

2. Description of the Prior Art

A film cartridge of the double compartment type well known in the prior art typically comprises a film supply compartment attached to a film takeup compartment by a rigid intermediate member which maintains the two compartments in fixed spaced relation to one another. An elongate strip of film initially is coiled within the film supply compartment, with its leading end extending into the takeup compartment where it is attached to a rotatable winding core. When the cartridge is loaded into a camera, the portion of the film strip extending between the two compartments is supported at a focal plane of the camera lens system by an exposure gate structure so that successive exposures can be made along the film strip as it is advanced through the exposure gate and wound into the takeup compartment by rotation of the winding core.

The exposure gate structure employed with such cartridges sandwiches a portion of the film strip between a flat forwardly facing surface of a back gate member and one or more coplanar rearwardly facing surfaces of a front gate member adapted to engage marginal regions of the front emulsion surface of the film laterally adjacent the film exposure area. Thus, the back surface of the portion of the film within the gate is held in flat supported contact with the flat surface of the back gate member, with the exposure area of the corresponding front film surface thereby being located in coincidence with a flat focal plane of the camera lens system.

In many previously-known constructions of this general type, the front gate member is an immovable element of the camera adapted to cooperate with a movable rear gate member, the latter being resiliently mounted either to the camera or to the cartridge itself to exert forward pressure on the portions of the film sandwiched between the two gate members. In such cameras, therefore, the position of the film plane is unaffected by slight variations in the position of the cartridge.

Alternatively, it is also known to incorporate both of the gate members within the cartridge itself, as disclosed in commonly assigned U.S. Pat. Nos. 3,138,081 and 3,138,084, relating to the currently popular type of film cartridge sold by the assignee of the present invention under the trademark KODAPAK. This type of cartridge is advantageous for a number of reasons, one of the most important being the fact that the cartridge cooperates with the internal construction of a corresponding camera to isolate the film from ambient light without requiring the entire cartridge to be enclosed within a lighttight camera housing. Additionally, the relatively inaccessible position of the film within the channellike exposure gate portion of the cartridge greatly reduces the likelihood of the film being damaged during loading or unloading of the camera or while the cartridge is removed therefrom. To simplify the construction of such a cartridge, the forwardly facing film engaging surface of the back gate member is formed integrally with the cartridge housing, rather than being a separate resiliently supported member, and is spaced from the rearwardly facing surface of the front gate member by a predetermined distance approximating the thickness of the film strip, and its light protective backing paper if such paper is provided. Therefore, it will be seen that accurate flat positioning of the film exposure area in predetermined relation to the lens system can be achieved only by careful adherence to critical tolerances determinative of the spacing between the opposed gate surfaces and of the positions of those surfaces relative to other cartridge surfaces by which the entire cartridge is supported within the camera.

SUMMARY OF THE INVENTION

The present invention relates to film cartridges and cameras which generally resemble those last described above, but in which the previously mentioned critical cartridge tolerances are reduced or substantially eliminated. This is achieved without sacrificing the various advantages afforded by that general mode of construction and without in any way complicating the structure or assembly of the subject cartridges and cameras. This significant improvement is accomplished in a simple but heretofore completely unobvious manner, by utilizing a fixed front gate member rigidly supported by the camera with its film engaging surfaces coplanar with a focal plane of a camera lens system, and by urging the entire cartridge toward the lens system so that the portion of the film strip adjacent the front gate member is sandwiched between that member and a flat forwardly facing back gate surface formed as an integral part of the cartridge. In other words, in contrast to previous constructions in which a front gate member affixed to the camera cooperates with a movable rear gate member comprising a separate element resiliently attached either to the camera or to the cartridge, an integral surface of the cartridge housing is adapted to serve as the equivalent back gate member by allowing the anterior position of the entire cartridge to be determined in relation to the camera by the cooperating elements of the exposure gate structure. Accordingly, the present invention substantially simplifies the construction of the cartridge and achieves accurate positioning of the film exposure area in predetermined relation to the camera lens system, without interfering with the employment of means analogous to those described in the above-identified patents for providing lighttight cooperation between the cartridge and the internal structure of the camera.

BRIEF DESCRIPTION OF THE DRAWING

The present invention will be more fully understood by reference to the following detailed description when read in conjunction with the attached drawing, wherein like reference numerals indicate like elements, and wherein:

FIG. 1 is a perspective view of a camera and film cartridge according to a preferred embodiment of the invention, illustrating the cartridge in position for insertion into the open camera;

FIG. 2 illustrates the loaded camera viewed from the top and depicted partially in cross section along the line 2-2 of FIG. 1 to illustrate internal details of the camera and the film cartridge therein;

FIG. 3 is an enlarged view of a portion of FIG. 2; and

FIG. 4 is an enlarged cross-sectional view of the same portion of the camera and cartridge shown in FIG. 3, taken along the line 4-4 of FIG. 2.

DESCRIPTION OF THE PREFERRED EMBODIMENT

As best shown by FIGS. 1 and 2, the illustrated film cartridge 11 comprises a molded plastic rear casing member 12, a molded plastic film supply compartment member 13, a somewhat larger molded plastic film takeup compartment member 14, an elongate strip of film 15, and a film winding core or spool 16. During the cartridge assembly operation, the compartment members are permanently cemented or otherwise attached to the casing member, as illustrated, to provide internal film supply and takeup chambers 17 and 18. To prevent ambient light from entering the film chambers between the adjoining edges of the casing member and the compartment members along the ends and sides of the cartridge, these edges are provided with continuous mating tongue and groove surfaces designated by numeral 19 in FIGS. 2 and 3, as disclosed in the previously mentioned U.S. Pat. No. 3,138,081. Similarly, the end flanges 21 of winding core 16 are rotatably supported by lighttight tongue and groove structure, as also disclosed by that patent.

The parallel inwardly disposed wall portions of film compartment members 13 and 14 include rearwardly extending projections, shown at 22 and 23, which are received, respectively, in corresponding grooves 24 and 25 in side flanges 26 of the cartridge casing member. As shown in FIGS. 1 and 4, flanges 26 are contiguous with and extend forwardly from the back wall member 27 of casing member 12 in close proximity to the corresponding edges of the film strip. At their respective rearward ends, projections 22 and 23 include inwardly facing opposed lips 28 and 29, which are spaced from the internal surface 31 of back wall member 27 by a distance corresponding to the thickness of film strip 15 to define film passageways 32 and 33. Accordingly, the film chambers are completely lighttight except at passageways 32 and 33, through which light is prevented from entering the chambers by the film strip itself. As previously mentioned, the film strip may be provided with protective backing paper, in which case the passageway would obviously be made correspondingly larger.

When the cartridge has been completely assembled, the film strip 15 initially is wound upon itself within the film supply chamber, with the leading end of the strip extending through the film passageways and into the takeup chamber where it is attached to the rotatable winding core or spool 16. Thus, the usable portion of the film strip is located initially within the supply chamber, from which it can be advanced progressively past an exposure opening or position between the two compartments and into the takeup chamber, by rotation of the winding core.

The internal wall surface 31 of casing member 12 defines a perfectly flat film support surface between the two film passageways, as indicated at 34, but curves forwardly beyond this flat central area in accordance with the invention disclosed and claimed in commonly assigned copending U.S. Pat. application Ser. No. 700,055 entitled METHOD AND APPARATUS FOR IMPROVING ROLL FILM FLATNESS IN A CAMERA EXPOSURE APERTURE and filed in my name on Jan. 24, 1968. Such a film path improves the flatness of the portion of the film at the exposure position by minimizing abrupt transitional curvature of the film as successive areas thereof are advanced into that position.

The illustrated camera includes an exterior housing comprising a front casing member 35 provided with a hinged rear cover door 36 adapted to close the housing when latched in the closed position illustrated in FIG. 2. An internal body member 37 is housed within the front casing member and includes a tapered rectangular opening 38 extending rearwardly from the lens system of the camera represented by lens 39. The illustrated lens is shown in fixed supported relation to the internal body member, but it should be understood that one or more elements of the lens system could be movable along the axis of the lens elements in a conventional manner to provide for focusing adjustment. Adjacent the rearward end of opening 38, the body member defines an open-ended rectangular boxlike structure 41 provided with a pair of film support rails 42, the rearwardly facing surfaces 43 of which are in coplanar relation to one another coincident with the focal plane at which the lens system focuses the image of an object within a given distance range from the camera. Between the two film guide rails, the other two rearward edge surfaces 44 of the boxlike structure are disposed slightly forwardly of surfaces 43, as explained in greater detail below.

When the cartridge is inserted into the camera, its film supply and takeup compartments occupy corresponding receptacles 45 and 46 in the body member. These two receptacles are joined by channels 47 adapted to accommodate the cartridge side flanges 26, so that the boxlike structure can be received between the flanges and the two compartment members with the film support rails in contact with corresponding marginal regions of the portion of the film strip extending between the two compartments. Accordingly, when the cartridge is so positioned within the camera, the only avenue by which light can reach the film strip is through the lens system, which is of course provided with an appropriate shutter, not shown. Therefore, although the illustrated cover door is adapted to provide a labyrinth seal between the door and the body member, it should be recognized that the door need not be lighttight to protect the film from ambient light when the camera is loaded. To provide optimum light sealing cooperation between the cartridge and the camera body member, it is preferable that the internal wall surfaces defining receptacles 45 and 46 and channels 47 should conform quite closely to the adjacent surfaces of the cartridge. However, it is essential that such surfaces of the cartridge and camera cannot abut against each other in a manner which might interfere with establishing intimate contact between the film and support rails 42. For the same reason, the axially movable and rotatable key member 48, which is adapted to rotate winding core 16 by engaging internal splines 49 within the tubular bore 51 of the core, fits quite loosely within the bore as shown in FIG. 2.

When the cover door is closed, the generally flat back surface 52 of the cartridge, surrounding label recess 53, is engaged by resilient arms 54 of a pressure spring member 55 attached to the camera door. Thereby, the entire cartridge is urged forwardly with sufficient forces to flatten the marginal regions of the film strip between surfaces 43 of support rails 42 and the opposite flat internal surface 31 of the cartridge's back wall member 27, without sandwiching the film so tightly between those surfaces as to prevent it from being freely advanced. Thus, the anterior position of the entire cartridge is determined solely by two gate members in engagement with opposite faces of the portion of the film within the gate structure.

While FIGS. 2—4 show the cartridge completely out of contact with the body member except along surfaces 43 of support rails 42, the cartridge could actually be in lateral contact with the body member in two directions; such contact being determinative of the lateral positioning of the cartridge relative to the various elements of the camera. However, the camera body member and the generally forwardly facing surfaces of the cartridge are at all times spaced apart to prevent interference with the anterior positioning of the cartridge by the resilient abutting cooperation of the support rails with the portion of the cartridge film in contact with internal cartridge surface 31.

With the cartridge so installed in the camera metering pawl member 56, extending through opening 57 in one of the guide rails, is aligned with recess 58 in back wall member 27 of the cartridge and is adapted to enter successive metering perforations in the film as shown at 59 in FIGS. 1, 3 and 4, thereby controlling the advancement of successive areas of the film into exposure position as well known in the prior art.

From the foregoing explanation, it should be apparent that the film gate of the present invention comprises a front gate member defined by support rails 42 of the boxlike camera structure 41 and a rear gate member comprising the flat internal surface 31 of the cartridge's back wall member 27. As best shown in FIGS. 3 and 4, the marginal edges of the forward emulsion surfaces of the exposure frame of the film strip within the exposure opening of the cartridge are held in engagement with the support rails by the forwardly biased rear gate member, whereby the central exposure area portion of the film aligned with the lens system is maintained in flat supported contact with flat rear gate member. Therefore, since surfaces 43 of support rails 42 are coincident with a focal plane of the lens system, the exposure area of the front emulsion surface of the film is likewise positioned in coincidence with that focal plane regardless of the thickness of the film.

By locating the other rearwardly facing surfaces 44 of the boxlike structure slightly forwardly of film engaging support rail surfaces 43, the front gate member engages only the edge portions of the film strip, beyond the central area of the film comprising the successive film exposure areas. Alternatively, surfaces 44 could be coplanar with surfaces 43 to provide frontal support to the film along a rectangular region completely surrounding the film exposure area within the gate; but experiments have shown that the illustrated construction provides very satisfactory positioning of the film exposure area, particularly when employed in conjunction with the previously mentioned smooth transition film guide arrangement described in the aforementioned patent application. Therefore, the illustrated construction appears preferable in that it allows the film to be sandwiched between the gate members with considerable force without risk of abrading the emulsion surface of the exposure areas as the film is pulled through the gate.

The preceding description relates to a particular embodiment of the invention but it should be readily apparent that the invention is equally applicable to many alternate embodiments thereof. Merely by way of example, the illustrated light-sealing cooperation between the cartridge and the camera body member could readily be augmented, if necessary, by providing cooperating tongue and groove means extending entirely around the boxlike structure or perhaps around the entire cartridge. Also, as previously indicated above, the film in the cartridge might be provided with a paper backing strip including exposure counting indicia visible through aligned apertures in the back wall of cartridge and the cover door, as illustrated in the patents referred to above. Furthermore, while many prior art film cartridge and camera combinations are particularly suitable either to miniature film sizes or to larger film sizes, but not to both, the present invention is readily adaptable to different types of still cameras employing film strips of almost any conventional length or width.

This invention has been described in detail with particular reference to preferred embodiments thereof, but it will be understood that variations and modifications can be effected within the spirit and scope of the invention as described hereinabove and as defined in the appended claims.

I claim:
1. A cartridge-camera combination for receiving and exposing film having an emulsion side, the combination comprising:
 a camera including coplanar surface means defining an exposure plane of the camera; and
 a cartridge including a rigid wall member defining a forwardly facing surface immovable relative to said wall member for supporting a frame of film for exposure, and means defining an exposure opening to an emulsion side of a frame of film on said film support surface, wherein said exposure opening has a size sufficient to receive said coplanar surface means such that said coplanar surface means is directly contactable by said emulsion side of said exposure frame, and including
 means for urging said cartridge toward said coplanar surface means to establish and maintain said direct contact.
2. In an apparatus comprising in combination:
 a cartridge for roll film, said cartridge comprising:
  a film supply compartment,
  a film takeup compartment,
  a backing member connecting said compartments and providing a flat support surface for the back side of an exposure frame of said film extending between said compartments, and
  a plurality of wall means defining an exposure opening to the emulsion side of said exposure frame of said film which is in contact with said backing member, and
 a camera adapted to receive said cartridge and comprising:
  means defining an exposure aperture, and
  coplanar surface means defining the exposure plane of said exposure aperture,
  the improvement wherein:
 said plurality of wall means defines an exposure opening having a size sufficient to receive said coplanar surface means such that said surface means directly contact said emulsion side of said exposure frame, and including
 means for urging said cartridge toward said coplanar surface means for establishing and maintaining said direct contact.
3. A camera comprising in combination
 a camera housing incorporating
  an internal body member within said housing,
  means providing an opening extending rearwardly through said internal body member,
  a generally rectangular boxlike structure supported by said internal body member and surrounding said opening at the rearward end thereof,
  a lens system located forwardly of said boxlike structure in alignment with said openings, and
  rearwardly facing surface means defined by said boxlike structure along at least two opposite sides of said opening, said surface means being coplanar with a focal plane of said lens system,
 a removable film cartridge adapted to be loaded into said camera and including
  a rigid wall member defining a flat forwardly facing film support surface immovable relative to said wall member,
  film compartment means rigidly attached to respective opposite ends of said wall member and defining corresponding film chambers beyond said flat film support surface thereof,
  means defining a film passageway leading into each of said film chambers adjacent the corresponding end of said flat film support surface, and
  an elongate strip of film extending through said passageways from one of said chambers into the other of said chambers with the back surface of a portion of said strip of film between said passageways located adjacent said flat forwardly facing film surface, said portion of said strip of film being aligned with said boxlike structure and engaged by said rearwardly facing surface means when said cartridge is loaded into said camera, and
 resilient means engageable with said cartridge so loaded into said camera for urging the entire cartridge toward said boxlike structure to resiliently sandwich regions of said portion of said strip of film beyond said opening between said rearwardly facing surface means and said forwardly facing film support surface.
4. The invention defined by claim 3 in which said camera housing is provided with a cover door movable between an open position and a closed position rearwardly adjacent said cartridge loaded into said camera, said resilient means comprising a resilient spring member attached to said cover door and adapted to be resiliently deformed between said cover door and a rearwardly facing surface of said cartridge when said cover door is in said closed position.
5. The invention defined by claim 3 in which said rearwardly facing surface means are defined by film support rails extending rearwardly from said boxlike structure and adapted to engage elongate regions of said portion of said strip of film extending along and adjacent the lateral edges thereof.
6. A camera comprising in combination:
 a camera housing incorporating
  an internal body member within said housing,
  means providing an opening extending rearwardly through said internal body member,
  a generally rectangular boxlike structure supported by said internal body member and surrounding said opening at the rearward end thereof,
  a lens system located forwardly of said boxlike structure in alignment with said opening and having a focal plane, and
  rearwardly facing surface means defined by said boxlike structure along at least two opposite sides of said opening, said surface means being coplanar with the focal plane of said lens system,
 a removable film cartridge adapted to be loaded into said camera and including
  a rigid wall member defining a flat forwardly facing film support surface immovable relative to said wall member,
  flange members extending forwardly from said wall member closely adjacent corresponding edges of a strip of film on said forwardly facing surface, film compartment means rigidly attached to respective opposite ends of said wall member and defining corresponding film chambers beyond said flat film support surface thereof, wherein said film compartment means project forwardly from said rigid wall member beyond said flat forwardly facing surface and are connected by said flange members, whereby said flange members and said film compartment means cooperate to define a continuous inwardly facing generally rectangular wall surface adapted to laterally surround said boxlike structure when said cartridge is loaded into said camera, means defining a film passageway leading into each of said film chambers adjacent the corresponding end of said flat film support surface, and means defining a film passageway leading into each of sad film chambers adjacent the corresponding end of said flat film support surface, and resilient means engageable with said cartridge so loaded into said camera for urging the entire cartridge toward said boxlike structure to resiliently sandwich regions of said portion of said strip of film beyond said opening between said rearwardly facing surface means and said forwardly facing film support surface.

7. A camera comprising in combination:

a removable film cartridge adapted to be loaded into said camera and including toward a rigid wall member defining a flat forwardly facing film support surface immovable relative to said wall member, flange members extending forwardly from said wall member closely adjacent corresponding edges of a strip of film on said forwardly facing surface, film compartment means rigidly attached to respective opposite ends of said wall member and defining corresponding film chambers beyond said flat film support surface thereof, wherein said film compartment means project forwardly from said rigid wall member beyond said flat forwardly facing surface and are connected by said flange members whereby said flange members and said film compartment means cooperate to define a continuous inwardly facing generally rectangular wall surface, means defining a film passageway leading into each of said film chambers adjacent the corresponding end of said flat film support surface, and an elongate strip of film extending through said passageways from one of said chambers into the other of said chambers with the back surface of a portion of said strip of film between said passageways located adjacent said flat forwardly facing film surface, and a camera housing incorporating an internal body member within said housing, said internal body member including means adapted when said cartridge is loaded into said camera to receive and laterally surround those external portions of said cartridge located forwardly of said portion of said strip of film without abutting anteriorly with said cartridge.

means providing an opening extending rearwardly through said internal body member, a generally rectangular boxlike structure supported by said internal body member and surrounding said opening at the rearward end thereof, said rectangular wall surface of said film cartridge being adapted to laterally surround said boxlike structure when said cartridge is loaded into said camera, a lens system located forwardly of said boxlike structure in alignment with said opening and having a focal plane, and rearwardly facing surface means defined by said boxlike structure along at least two opposite sides of said opening, said surface means being coplanar with the focal plane of said lens system, said portion of said strip of film being aligned with said boxlike structure and engaged by said rearwardly facing surface means when said cartridge is loaded into said camera, and resilient means engageable with said cartridge so loaded into said camera for urging the entire cartridge toward said boxlike structure to resiliently sandwich regions of said portion of said strip of film beyond said opening between said rearwardly facing surface means and said forwardly facing film support surface.

8. In a camera adapted to be loaded with a film cartridge including an elongate strip of film movable from a film supply chamber into a film takeup chamber along a flat forwardly facing cartridge wall surface immovable relative to said chambers and located rearwardly adjacent a portion of said strip of film extending between said chambers, the improvement in a gate structure for supporting said portion of said strip of film with its front surface coincident with a focal plane of a lens system of said camera, said gate structure comprising;

a front gate member defined by a rearwardly extending generally boxlike member immovably supported in said camera behind said lens system and surrounding the optical axis thereof, said boxlike member including rearwardly facing edge surface means coplanar with said focal plane at opposite sides of aid optical axis, a rear gate member defined by said flat forwardly facing cartridge wall surface located in rearward alignment with said rearwardly facing edge surface means of said boxlike member when said cartridge is loaded into said camera, and resilient means for urging the entire film cartridge in a forward direction when said cartridge is loaded into said camera to resiliently sandwich the regions of said portion of said strip of film adjacent said rearwardly facing edge surface means between those edge surface means and said flat forwardly facing cartridge wall surface, thereby maintaining the back surface of said portion of said strip of film in flat supported contact with said cartridge wall surface and positioning the corresponding front surface of said portion of said strip of film in coincidence with said focal plane.

9. In a camera adapted to be loaded with a film cartridge including an elongate strip of film movable from a film supply chamber into a film takeup chamber along a flat forwardly facing cartridge wall surface immovable relative to said chambers and located rearwardly adjacent a portion of said strip of film extending between said chambers, the improvement in a gate structure for supporting said portion of said strip of film with its front surface coincident with a focal plane of a lens system of said camera, said gate structure comprising:

a front gate member defined by a rearwardly extending generally boxlike member immovably supported in said camera behind said lens system and surrounding the optical axis thereof, said boxlike member including rearwardly facing edge surface means coplanar with said focal plane at opposite sides of said optical a rear gate member defined by said flat forwardly facing cartridge wall surface located in rearward alignment with said rearwardly facing edge surface means of said boxlike member when said cartridge is loaded into said camera, resilient means for urging the entire film cartridge in a forward direction when said cartridge is loaded into said camera to resiliently sandwich the regions of said portion of said strip of film adjacent said rearwardly facing edge surface means between those edge surface means and said flat forwardly facing cartridge wall surface, thereby maintaining the back surface of said portion of said strip of film in flat supported contact with said cartridge wall surface and positioning the corresponding front surface of said portion of said strip of film in coincidence with said focal plane, wherein said film cartridge includes inwardly facing wall surface means adapted when said cartridge is loaded into said camera to surround and confront the rearward portion of said boxlike member adjacent said rearwardly facing edge surface means thereof to obstruct lateral light penetration between said cartridge and said boxlike structure.

10. For use in a camera including
an internal body member,
a generally rectangular front gate member comprising an open-ended boxlike structure supported by said body member and provided with rearwardly facing edges defining corresponding coplanar rearwardly facing film support surfaces,
a cover door movable between an open position and a closed position, and
a resilient member attached to said door and supported thereby rearwardly of said front gate member when said door is in said closed position;
a film cartridge adapted to be loaded into said camera, said film cartridge comprising
a wall member provided with means defining a flat forwardly facing film support surface, end
film compartment members attached to opposite ends of said wall member in immovable relation to said film support surface and extending forwardly thereof to define a film supply chamber at one end of said wall member and a film takeup chamber at the opposite end of said wall member,
means defining film passageways communicating with said film supply and takeup chambers adjacent opposite ends of said film support surface,
an elongate strip of film extending through said passageways from said film supply chamber into said film takeup chamber with the portion of said film between said passageways located forwardly of and in parallel adjacent relation to said film support surface,
flange means extending forwardly orwardly from said wall member along and closely adjacent the edges of said portion of said film and adjoining said film compartment members to provide inwardly facing rectangularly disposed wall surfaces extending forwardly from and surrounding said portion of said film, said wall surfaces being adapted when said cartridge is loaded into said camera to laterally surround said front gate member engaged along said edge surfaces thereof with corresponding regions of the front surface of said portion of said film, and
means defining rearwardly facing surfaces along said wall member engageable by said resilient member when said cartridge is loaded into said camera and said cover door is in said closed position, whereby said resilient member urges said cartridge toward said front gate member to sandwich said regions of said portion of said film between said front gate member and said flat wall surface.

11. A double compartment film cartridge comprising;
a hollow film supply compartment member,
a hollow film takeup compartment member,
a substantially rigid wall member extending between and rigidly attached to said film compartment members, said wall member including a flat forwardly facing film support surface between and immovable relative to said compartment members,
means defining in each of said compartment members a film passageway adjacent the corresponding end of said film support surface,
an elongate strip of film extending through said passageways from within said film supply compartment into said film takeup compartment with the rearward surface of a portion of said strip of film between said passageways located closely adjacent said film support surface, and
parallel flange members extending forwardly from opposite edges of said wall member along the corresponding edges of said portion of said strip of film between said film compartment members, said flange members being adapted to straddle the corresponding lateral surfaces of a generally rectangular camera gate member received between said flanges and said film compartment members and posteriorly engaged with marginal regions of said portion of said film strip adjacent said flanges when said cartridge is loaded into a camera adapted for use therewith.

12. In a camera adapted to be loaded with a double compartment film cartridge comprising an elongate strip of film extending from a film supply compartment into a film takeup compartment past a rigid wall member located between and immovable relative to said compartments, the improvement in film gate means for supporting a portion of said strip of film extending between said compartments in a flat plane in predetermined relation to said camera when said cartridge is loaded therein, said improvement comprising;
a generally rectangular front gate member immovable relative to said camera and including coplanar rearwardly facing surface areas at opposite sides of an opening extending through said front gate member,
a back gate member comprising a generally rectangular forwardly facing flat surface area integral with said rigid wall member and located and back of said strip of film, cartridge is
means for laterally positioning said cartridge within said camera to align said rearwardly and forwardly facing surface areas of said front and back gate members adjacent opposite faces of said portion of said strip of film when said cartridge is loaded into said camera, and
resilient means engageable within said cartridge loaded into said camera for biasing said cartridge and thereby said back gate member toward said front gate member to resiliently sandwich regions of said portion of said strip of film located laterally beyond said opening between said rearwardly and forwardly facing surfaces of said gate members.

PO-1050
(5/69)

UNITED STATES PATENT OFFICE
CERTIFICATE OF CORRECTION

Patent No. __3,581,641__  Dated __June 1, 1971__

Inventor(s) __Hubert Nerwin__

It is certified that error appears in the above-identified patent and that said Letters Patent are hereby corrected as shown below:

Column 7, lines 13 through 15, should be deleted; after line 18, -- an elongate strip of film extending through said passageways from one of said chambers into the other of said chambers with the back surface of a portion of said strip of film between said passageways located adjacent said flat forwardly facing film surface, said portion of said strip of film being aligned with said boxlike structure and engaged by said rearwardly facing surface means when said cartridge is loaded into said camera, and -- should be inserted; and line 27, "toward" should be deleted. Column 8, line 24, "aid" should be -- said --. Column 9, line 19, "end" should be deleted; and line 34, "orwardly" should be deleted. Column 10, lines 40 and 41, "and back of said strip of film, cartridge is" should be -- behind said portion of said strip of film --.

Signed and sealed this 4th day of January 1972.

(SEAL)
Attest:

EDWARD M. FLETCHER, JR.          ROBERT GOTTSCHALK
Attesting Officer               Acting Commissioner of Patents